(12) United States Patent
Elmi et al.

(10) Patent No.: US 12,105,808 B2
(45) Date of Patent: Oct. 1, 2024

(54) AUTOMATED TRUST CENTER FOR REAL-TIME SECURITY AND COMPLIANCE MONITORING

(71) Applicant: DRATA INC., San Diego, CA (US)

(72) Inventors: Brian S. Elmi, San Diego, CA (US); Ross W. Hosman, Colorado Springs, CO (US); Adam R. Markowitz, Carlsbad, CA (US); Daniel Zev Marashlian, San Diego, CA (US)

(73) Assignee: DRATA INC., San Diego, CA (US)

( * ) Notice: Subject to any disclaimer, the term of this patent is extended or adjusted under 35 U.S.C. 154(b) by 290 days.

(21) Appl. No.: 17/898,383

(22) Filed: Aug. 29, 2022

(65) Prior Publication Data
US 2024/0095368 A1 Mar. 21, 2024

Related U.S. Application Data

(60) Provisional application No. 63/325,969, filed on Mar. 31, 2022.

(51) Int. Cl.
G06F 21/57 (2013.01)
H04L 9/40 (2022.01)
H04L 67/10 (2022.01)

(52) U.S. Cl.
CPC ........ *G06F 21/577* (2013.01); *H04L 63/1441* (2013.01); *H04L 63/20* (2013.01); *H04L 67/10* (2013.01); *G06F 2221/034* (2013.01); *G06F 2221/2101* (2013.01); *G06F 2221/2115* (2013.01)

(58) Field of Classification Search
CPC ............ G06F 21/577; G06F 2221/034; G06F 2221/2101; G06F 2221/2115; H04L 63/1441; H04L 63/20; H04L 67/10
See application file for complete search history.

(56) References Cited

U.S. PATENT DOCUMENTS

| | | | |
|---|---|---|---|
| 10,091,230 B1 * | 10/2018 | Machani | G06F 21/577 |
| 10,104,182 B1 * | 10/2018 | Lowit | H04L 67/10 |
| 10,884,810 B1 * | 1/2021 | Verma | H04L 67/02 |

(Continued)

FOREIGN PATENT DOCUMENTS

| | | | |
|---|---|---|---|
| CN | 102279967 A | * | 12/2011 |
| WO | 2023192525 A1 | | 10/2023 |

OTHER PUBLICATIONS

International Search Report & Written Opinion PCT/US2023/016979, dated Jul. 3, 2023, 12 pages.

*Primary Examiner* — Richard G Keehn

(57) ABSTRACT

Automated trust center for real-time security and compliance monitoring including maintaining, for an organization, a plurality of control statuses for a trust center report, including: retrieving control status responses from a group of services providers of the organization, wherein each control status response is associated with a control in the trust center report; and determining, based on the control status responses, a control status for each control of the trust center report; receiving a request for the trust center report from an organization client; generating, in real-time, the trust center report using the control statuses for each control; and providing, to the organization client, the trust center report generated in real-time using the control statuses for each control.

20 Claims, 8 Drawing Sheets

(56) References Cited

U.S. PATENT DOCUMENTS

| | | | | |
|---|---|---|---|---|
| 11,422,744 | B2* | 8/2022 | Ganesan | H04L 67/1097 |
| 11,595,432 | B1* | 2/2023 | Vella | H04L 63/1458 |
| 2004/0128186 | A1* | 7/2004 | Breslin | G06Q 40/08 |
| | | | | 705/7.28 |
| 2007/0198214 | A1* | 8/2007 | Bade | G06F 21/577 |
| | | | | 702/182 |
| 2011/0060947 | A1* | 3/2011 | Song | G06F 21/57 |
| | | | | 718/1 |
| 2011/0154034 | A1* | 6/2011 | Bailey, Jr. | H04L 63/20 |
| | | | | 713/168 |
| 2011/0178933 | A1* | 7/2011 | Bailey, Jr. | H04L 63/20 |
| | | | | 726/1 |
| 2013/0291098 | A1* | 10/2013 | Chung | G06F 21/577 |
| | | | | 726/21 |
| 2013/0304900 | A1* | 11/2013 | Trabelsi | H04L 67/1057 |
| | | | | 709/224 |
| 2019/0020657 | A1* | 1/2019 | Egner | H04L 63/10 |
| 2019/0172073 | A1* | 6/2019 | Wiig | G06Q 10/06315 |
| 2019/0230073 | A1* | 7/2019 | Patel | H04L 63/20 |
| 2019/0318100 | A1* | 10/2019 | Bhatia | G06F 21/577 |
| 2019/0394243 | A1* | 12/2019 | Wiig | H04L 63/1441 |
| 2021/0117893 | A1* | 4/2021 | Sohum | G06Q 30/0613 |
| 2021/0168167 | A1* | 6/2021 | Kirti | H04L 63/20 |
| 2021/0314363 | A1* | 10/2021 | Hensley | H04L 63/0263 |
| 2021/0334402 | A1* | 10/2021 | Detchemendy | H04L 63/1425 |
| 2022/0210142 | A1* | 6/2022 | Sohail | G06F 21/30 |
| 2022/0232041 | A1* | 7/2022 | Poli | H04L 63/20 |
| 2023/0188527 | A1* | 6/2023 | O'Neill | H04L 63/20 |
| | | | | 726/10 |
| 2023/0300150 | A1* | 9/2023 | O'Neill | H04L 63/20 |
| | | | | 726/22 |

* cited by examiner

AUTOMATED TRUST CENTER FOR REAL-TIME SECURITY AND COMPLIANCE MONITORING

CROSS REFERENCE TO RELATED APPLICATION

This is a non-provisional application for patent entitled to a filing date and claiming the benefit of earlier-filed U.S. Provisional Patent Application No. 63/325,969, filed Mar. 31, 2022, herein incorporated by reference in its entirety.

DESCRIPTION OF EMBODIMENTS

Many businesses employ external service providers to perform various aspects of the business's operations. At the same time, businesses are increasingly subject to regulations and standards that require specific procedures to be followed and documented. As businesses continue to expand utilization of cloud-based systems and services, the need for monitoring the security, privacy, and confidentiality of data that passes through or is stored on the third-party systems and services also increases.

Figure 1:
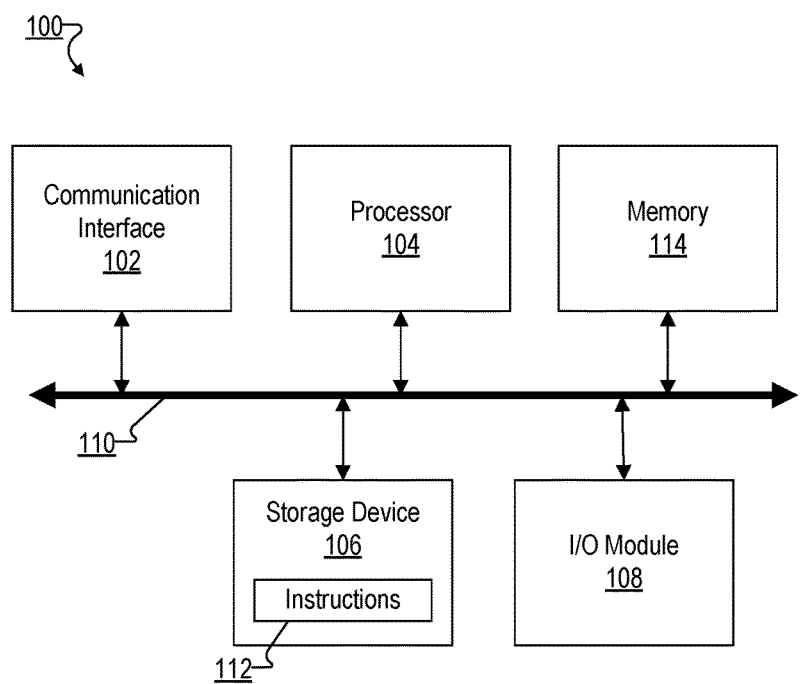
FIG. 1 illustrates an example computing device for security and compliance monitoring in accordance with some implementations.

Example methods, apparatus, and products for an automated trust center for real-time security and compliance monitoring in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, an input/output (I/O) module 108, and computer memory 114 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
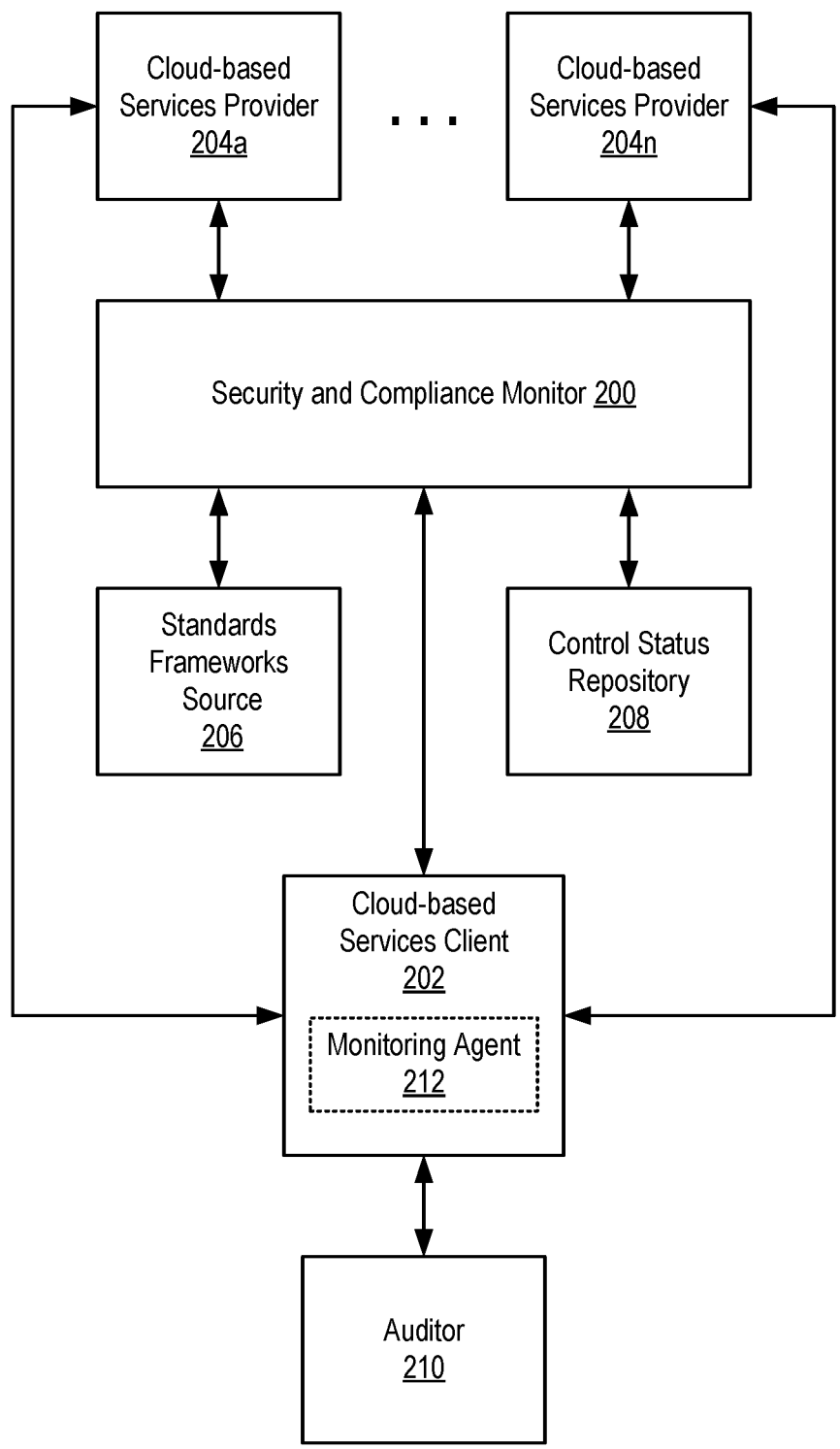
FIG. 2 illustrates an example system for security and compliance monitoring in accordance with some implementations.

For further explanation, FIG. 2 illustrates an exemplary block diagram depicting an end-to-end security and compliance automation platform for security and compliance monitoring in accordance with some embodiments of the present disclosure. The system of FIG. 2 includes a security and compliance monitor 200, a cloud-based services client 202, multiple cloud-based services providers 204a, 204n, a standards framework source 206, a control status repository 208, and an auditor 210. The cloud-based services client 202 optionally includes a monitoring agent 212. Each element presented may be hosted by a computing system (not shown). Specifically, the security and compliance monitor 200 may be hosted by a security and compliance monitor computing system, the cloud-based services client 202 may be hosted by a cloud-based services client computing system, each cloud-based services providers 204a, 204n may be hosted by a cloud-based services provider computing system, the standards framework source 206 may be hosted by a standards framework source computing system, the control status repository 208 may be hosted by a control status repository computing system, and the auditor 210 may be hosted by an auditor computing system.

The security and compliance monitor 200 is hardware, software, or an aggregation of hardware and software configured to determine a degree to which a cloud-based services client 202 is complying with a particular security and compliance framework. Specifically, the security and compliance monitor 200 monitors a set of controls for service providers that support the cloud-based services client 202. Each control monitored by the security and compliance monitor 200 is associated with at least one element of a security and compliance framework. The security and compliance monitor 200 uses the status of each control to compile a report detailing the compliance status of the cloud-based services client 202 with regard to the security and compliance framework.

The cloud-based services client 202 is an entity that utilizes the services provided by the cloud-based services providers 204a, 204n. The cloud-based services client 202 may be an organization that itself provides a service or product to other clients utilizing the collection of services supplied by the cloud-based services providers 204a, 204n. For example, the cloud-based services client 202 may be a software developer that utilizes cloud-based services including cloud-based storage, cloud-based development tools, cloud-based ticketing, and cloud-based human resources.

The cloud-based services client 202 may be a "cloud-native" organization that creates products using cloud-based services providers 204a, 204n. The cloud-based services client 202 may be "cloud-first" and exclusively utilize computing resources, applications, and systems provided by cloud-based services providers 204a, 204n for some or all aspects of the organization. Regardless of the level of reliance on cloud-based services providers 204a, 204n, in order to be in full compliance with any legally- or operationally-required frameworks, the cloud-based services client 202 must verify that each cloud-based services providers 204a, 204n is operating in a manner consistent with those frameworks.

The cloud-based services client 202 may utilize other services that are not cloud-based services (relative to the cloud-based services client 202). Specifically, the cloud-based services client 202 may include services (e.g., enterprise productivity suites, virtualization software, etc.) provided by other entities and hosted on computing systems under the control of cloud-based services client 202. For such services, the security and compliance monitor 200 sends the control status requests 308 to the computing systems of the cloud-based services client 202 instead of a third-party computing system.

The monitoring agent 212 is hardware, software, or an aggregation of hardware and software configured to retrieve the control status responses on behalf of the security and compliance monitor 200. The monitoring agent 212 may be optionally utilized in circumstances in which the security and compliance monitor 200 is unable to retrieve the control status responses directly. For example, a particular cloud-based service provider may require that control status requests originate from the cloud-based services client 202. The monitoring agent 212 may also be configured to retrieve the control status responses from services that are not cloud-based.

The monitoring agent 212 may receive instructions from the security and compliance monitor 200 and, in response, send a control status request to one or more cloud-based services provider 204a, 204n. Alternatively, the monitoring agent 212 may send control status requests to one or more cloud-based services provider 204a, 204n based on a pre-defined schedule (e.g., every six hours, etc.). Once retrieved, the monitoring agent 212 may be configured to forward the control status response to the security and compliance monitor 200.

As discussed above, the cloud-based services client 202 is an entity obligated to abide by standards frameworks for legal and/or business purposes. A standards framework (also referred to as a security and compliance framework) defines procedures that must be followed, tracked, and documented in order to comply with the particular law or standard around which the framework has been constructed. Many standards frameworks describe the manner in which customer or employee data must be managed. Other standards frameworks describe the disclosure or training obligations to employees or customers.

Each standards framework may be composed of human-readable text detailing the obligations of the entity to be in compliance with the standards framework. Each obligation includes one or more elements to satisfy the obligation. The elements of the standards framework may be explicit from the text or derivable based on the text. For example, one obligation of a framework may dictate that, when stored, user data must be encrypted using a specified minimum standard. Two elements for this obligation may therefore be that the data must be encrypted and that the encryption level must conform to at least the specified minimum standard. Each element of the standards framework is associated with a control. A control is a measurable component exposed by a services provider. Continuing with the example, a first control may be whether or not the user data is encrypted and a second control may be the level of encryption employed.

The standards framework source 206 is a system that provides updated standards frameworks to the security and compliance monitor 200. The standards framework source 206 may be part of or work in conjunction with the business or regulatory body that defines the standards framework. The standards framework source 206 may provide the standards framework as human-readable text or a list of obligations. Alternatively, the standards framework source 206 may derive the elements or controls from the standards framework and provide the elements or controls to the security and compliance monitor 200. If the standards framework source 206 provides the standards framework as human-readable text or a list of obligations, then the security and compliance monitor 200 itself may derive the elements or controls from the standards framework.

The control status repository 208 is storage for control statuses. The control status repository 208 may be a storage system within the security and compliance monitor 200 or may be a storage system utilized by the security and compliance monitor 200. The control status repository 208 may be a cloud-based data warehouse or other system hosting a database that contains the control statuses.

A control status is the state of the control retrieved from the services provider (e.g., cloud-based services providers 204a, 204n). The control status may be a Boolean response (i.e., true or false), a selection from a group (e.g., low, medium, or high), or some other form of data. The control status is retrieved from the services provider using a control status request and control status response (described in further detail below in reference to FIG. 3).

The cloud-based services providers 204a, 204n are entities that supply a resource or product to the cloud-based services client 202 over a wide-area network. Each cloud-based services provider 204a, 204n may include a collection of computer systems working in concert to provide the resource or product over the Internet (examples of which are described below in reference to FIG. 3). In addition to providing the resource or product, each cloud-based services provider 204a, 204n also exposes an interface allowing the security and compliance monitor 200 or monitoring agent 212 to retrieve control statuses from the services provider 204a, 204n.

The auditor 210 is system under the control of an entity tasked with the inspection of an organizations' processes and records to ensure the entity (i.e., the cloud-based services client 202) is in compliance with a particular framework or group of frameworks. The auditor 210 may initially request the report which triggers the cloud-based services client 202 to request that the security and compliance monitor 200 generate the standards framework report (by obtaining the control statuses from the cloud-based services providers 204a, 204n). Once the standards framework report is compiled, the security and compliance monitor 200 sends, via the cloud-based services client 202, the report to the auditor 210.

Figure 3:
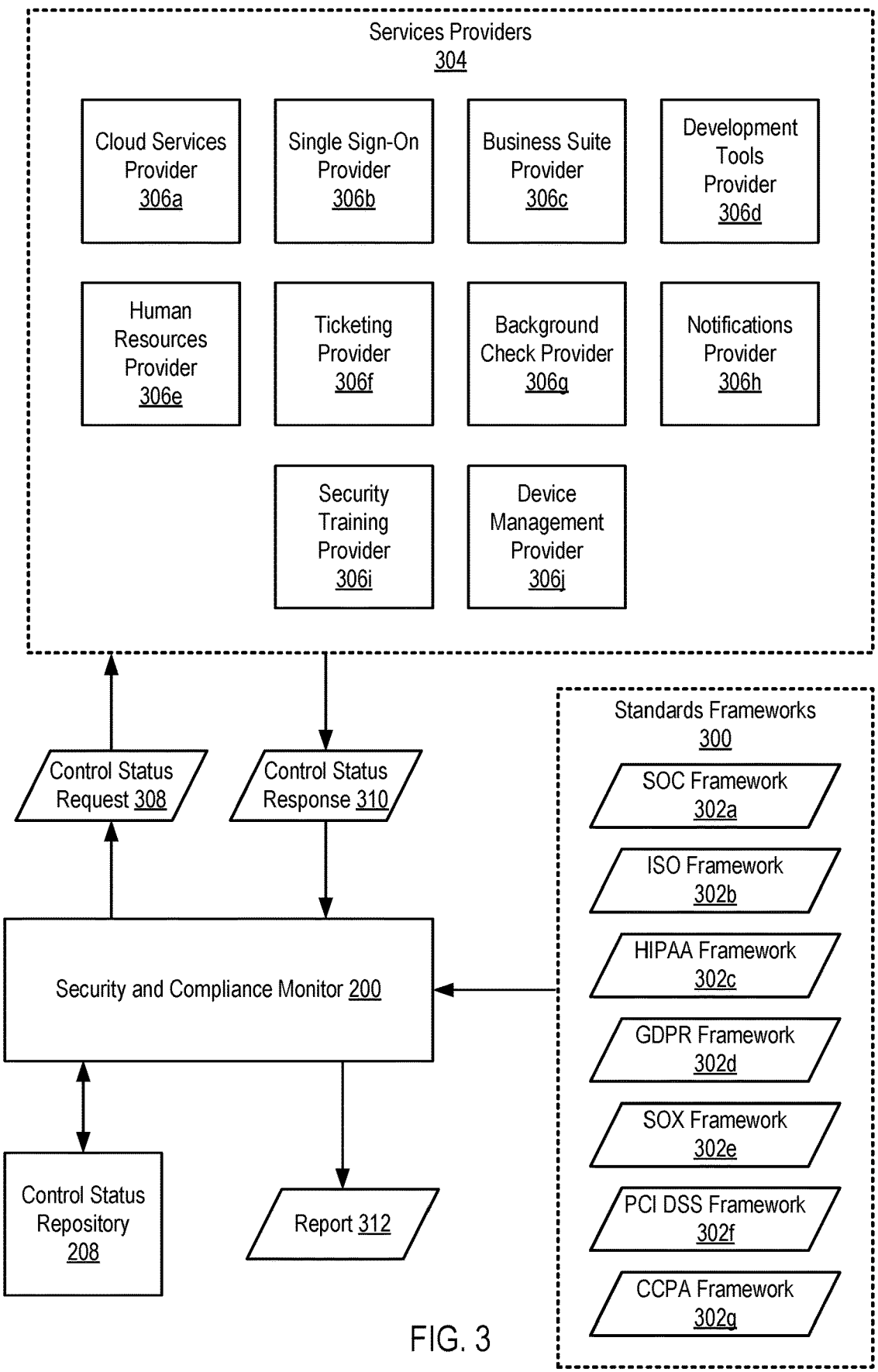
FIG. 3 illustrates an example system for security and compliance monitoring in accordance with some implementations.

For further explanation, FIG. 3 illustrates an exemplary block diagram depicting a system for security and compliance monitoring in accordance with some embodiments of the present disclosure. Specifically, the system of FIG. 3 includes details of the interactions between the security and compliance monitor 200, service providers 304, and standards frameworks 300.

The service providers 304 in FIG. 3 include a cloud services provider 306a, a single sign-on provider 306b, business suite provider 306c, a development tools provider 306d, a human resources provider 306e, a ticketing provider 306f, a background check provider 306g, a notifications provider 306h, a security training provider 306i, and a device management provider 306j.

A cloud services provider 306a is a supplier of a cloud-based platform, infrastructure, application or storage services. Examples of controls for cloud services providers 306a include frequency of data backups, level of data security, and location of stored data. A single sign-on provider 306b is a supplier of authentication across multiple third party applications. Examples of controls for single sign-on providers include access controls, level of access for each user, and role-level security. A business suite provider 306c is a supplier of business applications for communications and data operations across and within businesses. Examples of controls for business suite providers include customer data handling, data access controls, and communications data security. A development tools provider 306d is a supplier of applications that allow developers to create, test and debug software. Examples of controls for development tools providers include customer data handling, best practices implementations, and data access controls. A human resources provider 306e is a supplier of employee management software and services. Examples of controls for human resources providers include employee data security and employee safety metrics. A ticketing provider 306f is a supplier of applications and services for addressing information technology issues. Examples of controls for ticketing providers include data access controls, employee data security, and customer data security. A background check provider 306g is a supplier of services to review potential employee's criminal, commercial and financial records. Examples of controls for background check providers include employee data security and potential employee data security. A notifications provider 306h is a supplier of communications applications for an enterprise environment. Examples of controls for notifications providers include employee data security and communications data security. A security training provider 306i is supplier of training systems for enterprise employees. Examples of controls for security training providers include training completion level for each employee, and employee data security. A device management provider 306j is a supplier of services that control data, configuration settings and applications on all devices used within an enterprise. Examples of controls for device management providers include device security, device access controls, and employee data security. As discussed above, the services providers may include services that are not cloud-based services.

The standards frameworks 300 in FIG. 3 include a System and Organization Controls (SOC) framework 302a, an International Organization for Standardization (ISO) framework 302b, a Health Insurance Portability and Accountability Act (HIPAA) framework 302c, a General Data Protection Regulation (GDPR) framework 302d, a Sarbanes-Oxley Act (SOX) framework 302e, a Payment Card Industry Data Security Standard (PCI DSS) framework 302f, and a California Consumer Privacy Act (CCPA) framework 302g.

The SOC framework 302a (also sometimes referred to as service organizations controls) as defined by the American Institute of Certified Public Accountants (AICPA), is the name of a suite of reports produced during an audit. It is intended for use by service organizations (organizations that provide information systems as a service to other organizations) to issue validated reports of internal controls over those information systems to the users of those services. The reports focus on controls grouped into five categories called Trust Service Principles, including Security, Availability, Confidentiality, and Privacy.

The ISO framework 302b is a group of information security standards published jointly by the International Organization for Standardization (ISO) and the International Electrotechnical Commission (IEC). ISO 27000 provides best practice recommendations on information security management (the management of information risks through information security controls) within the context of an overall Information security management system (ISMS), similar in design to management systems for quality assurance (the ISO 9000 series), environmental protection (the ISO 14000 series) and other management systems.

The HIPPA framework 302c is built around a U.S. law that specifies the flow of healthcare information and stipulates how personally identifiable information maintained by the healthcare and healthcare insurance industries should be protected from fraud and theft. HIPPA generally prohibits healthcare providers and healthcare businesses, called covered entities, from disclosing protected information to anyone other than a patient and the patient's authorized representatives without their consent. Technical safeguards are specified and must be followed to be in compliance with HIPAA. Such technical safeguards specify controls for accessing computer systems and protecting data communications, among other controls.

The GDPR framework 302d is built around a regulation in European law on data protection and privacy in the European Union and the European Economic Area. The GDPR is a component of EU privacy law and of human rights law, in particular Article 8 of the Charter of Fundamental Rights of the European Union.

The SOX framework 302e is built around a U.S. law that mandates certain practices in financial record keeping and reporting. Section 404 of the SOX regulation requires organizations to implement internal controls to ensure their financial reporting is accurate. SOX controls, also known as SOX 404 controls, are rules that can prevent and detect errors in a company's financial reporting process. Internal controls are used to prevent or discover problems in organizational processes, ensuring the organization achieves its goals. Amongst other controls, SOX requires that all financial reports include an Internal Controls Report. This report should show that the company's financial data is accurate (a 5% variance is permitted) and that appropriate and adequate controls are in place to ensure that the data is secure.

The PCI DSS framework 302f is an information security standard for organizations that handled credit cards schemes. Card schemes are payment networks linked to payment cards, such as debit or credit cards, of which a bank or any other eligible financial institution can become a member. By becoming a member of the scheme, the member then gets the possibility to issue cards or acquire merchants operating on the network of that card scheme. Visa and MasterCard are two of the largest global brands, known as card schemes, or card brands. PCI DSS sets standard controls for merchants to meet minimum levels of security for storing, processing, and transmitting cardholder data.

The CCPA framework 302g is built around a California state statute intended to enhance privacy rights and consumer protection for residents of California, United States.

As discussed above, each framework is composed of elements that, when satisfied, indicate compliance with the particular framework. Whether the element is satisfied is determined by retrieving a status of the associated control from the particular services provider 304. Obtaining the control statuses may be performed using control status requests 308 and control status responses 310. A control status request 308 is a message targeting a particular services provider 304 requesting information about a control. The control status request 308 may include code that instructs the particular services provider 304 to generate a control status response 310. A control status response 310 is a message that describes the state of a particular control within the services provider 304. The control status responses 310 may be in the form of state specifications. A state specification is a collection of data that conveys data objects from one system to another. The state specification may be a standard file format used to exchange data in asynchronous browser-server communication. For example, the state specification may be a JavaScript Object Notation specification.

The framework report 312 is the collection of control statuses that correspond to the elements of a particular standards framework. The framework report 312 conveys to the auditor the compliance state of the services client. The report 312 may be provided in response to a request by an auditor or services client. Further, the report 312 may be generated in response to regulatory obligations or as a condition of a particular business agreement.

Figure 4:
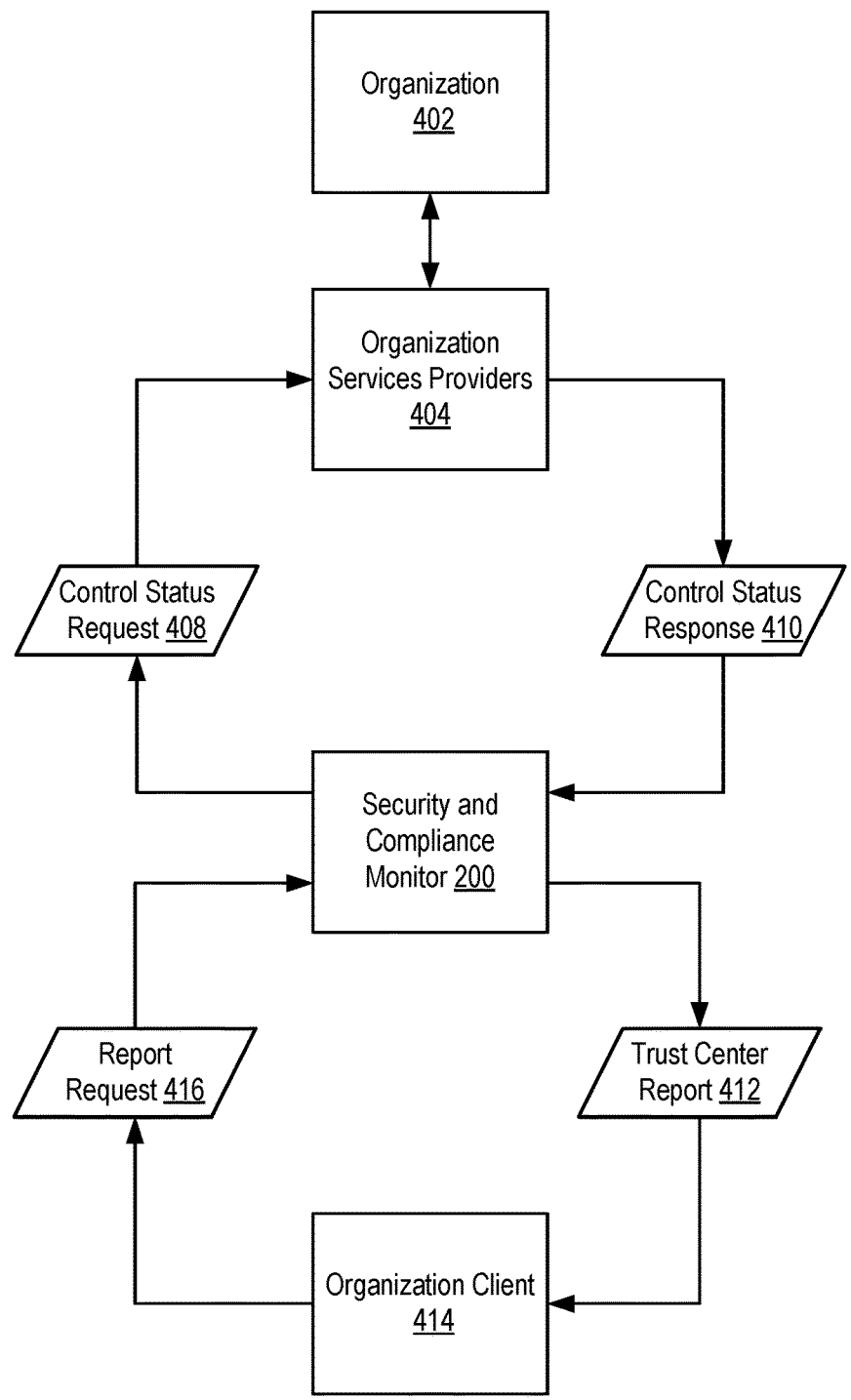
FIG. 4 illustrates an example system for an automated trust center for real-time security and compliance monitoring in accordance with some implementations.

For further explanation, FIG. 4 illustrates an exemplary block diagram depicting a system for security and compliance monitoring in accordance with some embodiments of the present disclosure. Specifically, the system of FIG. 4 is an embodiment of the system for security and compliance monitoring in which an organization client 414 requests and is presented with a trust center for an organization 402 that includes the status for a variety of controls.

In order to instill confidence in their clients, an organization may provide a trust center. A trust center is a presentation of information about an organization's practices, policies, and procedures on privacy, security, transparency, and compliance. An automated trust center is a trust center in which the status of the controls that make up the trust center are retrieved and updated automatically (e.g., by a security and compliance monitor 200). An automated trust center that provides real-time security and compliance monitoring is a trust center that reflects the current status of each control with minimal delay for retrieval and/or based on a service level agreement.

As shown in FIG. 4, the example system includes an organization 402, organization services providers 404, the security and compliance monitor 200, and the organization client 414. The security and compliance monitor 200 sends control status requests 408 to the organization services providers 404 and receives control status responses 410 from the organization services providers 404. The security and compliance monitor 200 receives the report request 416, generates the trust center report 412, and provides the trust center report 412 to an organization client 414. The trust center report 412 is a type of standards framework that may include controls from more than one other framework, customizable by the organization 402. The system of FIG. 4 is an example configuration of FIG. 2 in which the organization 402 is the services client and employs the security and compliance monitor 200 to generate the trust center report 412 for the organization client 414. The organization 402 is an entity that utilizes service providers 404 and has employed the security and compliance monitor 200 to host a trust center for the organization 402. An organization client 414 is an entity with an interest in the security and compliance status of the organization 402. The organization client 414 may be an entity that employs the services of the organization 402.

Figure 5:
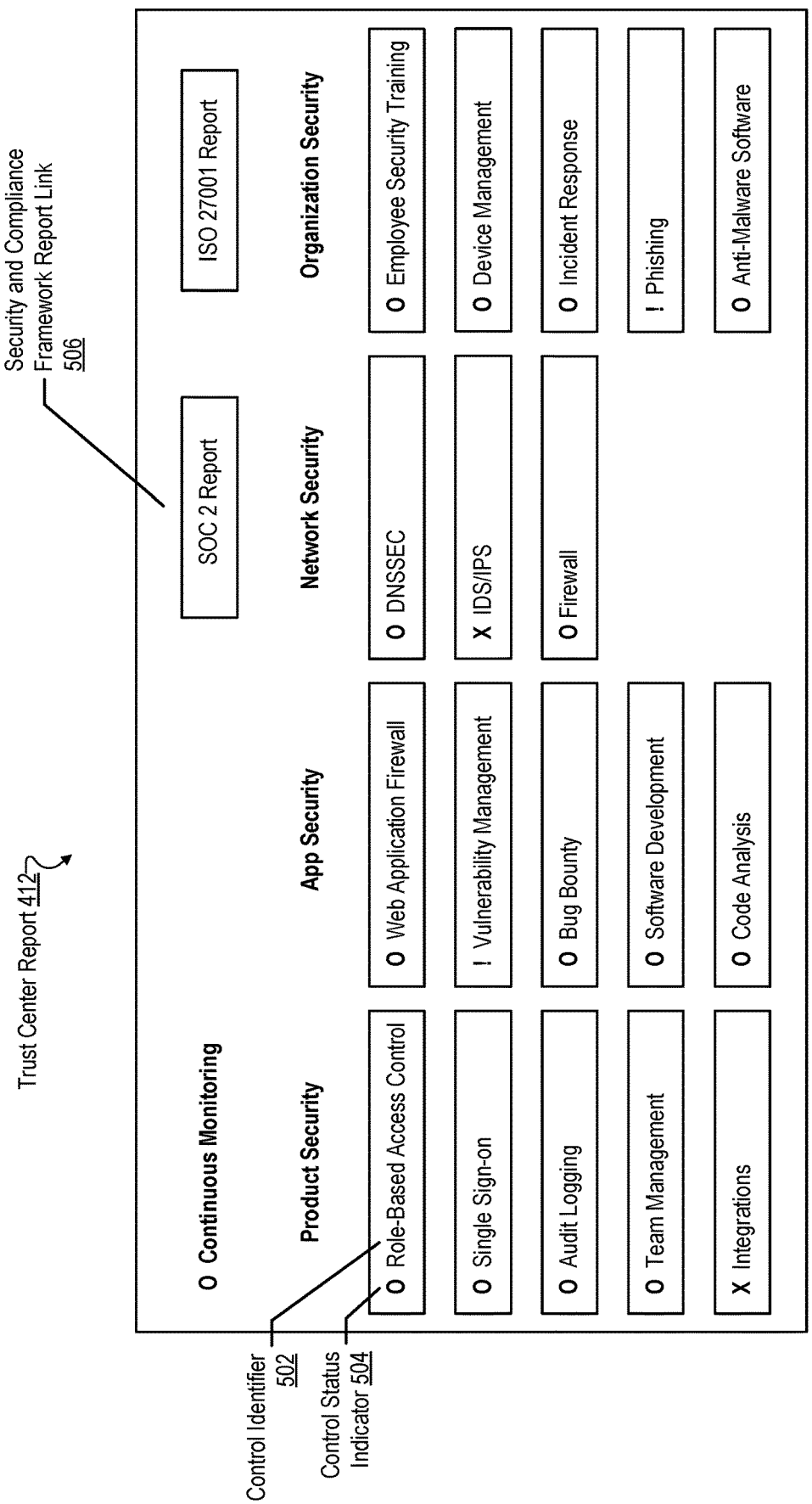
FIG. 5 illustrates an example automated trust center for real-time security and compliance monitoring in accordance with some implementations.

For further explanation, FIG. 5 illustrates an exemplary trust center report 412 in accordance with some embodiments of the present disclosure. Similar to a framework report, a trust center report 412 is a collection of control statuses for controls selected for the trust center. The trust center controls may be selected as those of particular interest to organization clients. Alternatively, or additionally, the trust center controls may be selected from a widely-used standards framework. The trust center report 412 may be embodied as a dynamic webpage retrievable via a link within the organization's domain. Although appearing to be part of the organization's website, when requested, some or all of the webpage may be retrieved from the security and compliance monitor.

As shown in FIG. 5, the trust center report 412 presents controls and the associated control statuses retrieved by the security and compliance monitor. The trust center report 412 includes a control identifier 502 for each control and a control status indicator 504 that displays a symbol to signify the status of the associated control. Specifically, a control status indicator 504 of "O" indicates that the control is in compliance, a control status indicator 504 of "!" indicates that the control is out of compliance but not yet failing, and a control status indicator 504 of "X" indicates that the control is failing. The amount of time before a failed test for a control renders that control to be out-of-compliance may be set by the organization via a service level agreement (SLA) with the security and compliance monitor, based on the compliance standard itself, set by the platform globally for all organization's trust center, set by the platform for the entity based on a variety of factors of the organization (organization size, type of organization, business segment of the organization, age of the organization, and so on). The security and compliance monitor, when hosting trust centers for organizations, may enable an organization to customize the trust center for branding purposes.

In some implementations, clicking on any of these controls may provide various information to a user of the trust center. For example, clicking on an anti-DDoS control may provide a user with the various protocols or hardware in place to rebuff such DDoS attacks. The trust center may also provide evidence of the monitoring when a control is clicked on. That is, when clicking on, for example, "Single Sign on," not only might trust center provide details regarding the IDP utilized by the entity to provide single sign on, but also the date, time, and specifics of a recent test of the entities IDP in practice.

The trust center report 412 of FIG. 5 also includes two security and compliance framework report links 506. Each security and compliance framework report link 506, when activated, initiates the retrieval of a security and compliance framework report, such as an SOC framework report or a ISO 27001 framework report.

While particular combinations of various functions and features of the one or more embodiments are expressly described herein, other combinations of these features and functions are likewise possible. The present disclosure is not limited by the particular examples disclosed herein and expressly incorporates these other combinations. For further explanation, FIG. 6 sets forth a flow chart illustrating an exemplary method for an automated trust center for real-time security and compliance monitoring according to embodiments of the present invention. Although depicted in less detail, the system may include some or all of the components described above. The example method depicted in FIG. 6 includes maintaining 602, for an organization by a security and compliance monitor 200, a plurality of control statuses for a trust center report 412. Maintaining 602 a plurality of control statuses for the trust center report 412 may be carried out by storing (e.g., in a control status repository) recent control statuses for the trust center report 412 and continuously updating the control statuses to reflect the real-time or near real-time condition of the controls within the group of service providers 404. Real-time, as used herein, refers to being contemporaneous with the report request 416. The real-time state of the control status may be offset by no longer than the length of time between control status updates.

Maintaining 602 a plurality of control statuses for the trust center report 412 may also be carried out by receiving authorization from the organization to access the group of services providers 404. Specifically, the group of service providers 404 may each require the security and compliance monitor 200 to be authorized before providing the control status response 410. Therefore, the security and compliance monitor 200 may obtain authorization from the organization to access the necessary data from each of the group of service providers 404 in order to retrieve the control status response 410. The authorization may be in the form of a password or token provided from the organization to the security and compliance monitor 200. Once the authorization mechanism is obtained, the security and compliance monitor 200 uses the authorization to retrieve the control status responses 410.

Maintaining 602 a plurality of control statuses for the trust center report 412 includes retrieving 604, by the security and compliance monitor 200, control status responses 410 from a group of services providers 404 of the organization, wherein each control status response 410 is associated with a control in the trust center report 412. Retrieving 604 control status responses 410 from the group of services providers 404 may be carried out by issuing a control status request to the group of services providers and receiving, in response, the control status responses 410. The control status requests may be commands submitted via a command line interface exposed by the services providers. The control status responses 410 may be state specifications provided in response to the submitted commands.

Retrieving 604 control status responses 410 from the group of services providers 404 may be carried out periodically. Specifically, each control status response may be retrieved at the expiration of a period of time set for each control status. The period of time may be different for each control status and may be based on various factors, including, for example, the severity of failing the control, historical data indicating frequency of failure events, and system efficiency.

Maintaining 602 a plurality of control statuses for the trust center report 412 also includes determining 606, by the security and compliance monitor 200 based on the control status responses 410, a control status for each control of the trust center report 412. Determining 606, based on the control status responses 410, the control status for each control of the trust center report 412 may be carried out by translating the control status responses 410 into control statuses for each control of the trust center report 412. The control status responses 410 may include additional information unrelated to the individual control status. Further, the control status responses 410 may not succinctly indicate the control status of the control. Consequently, the security and compliance monitor 200 may perform various operations on the control status responses 410 in order to extract the control status. For example, the security and compliance monitor 200 may compare elements in a control status response 410 to a value (such as a minimum or maximum value allowed) to determine the control status for the control.

For example, for one control status, the security and compliance monitor 200 may generate a command requesting the frequency of data backups performed on a particular data set. The security and compliance monitor 200 may then send the command to a cloud services provider via a command line interface. In response, the security and compliance monitor 200 may receive a state specification detailing that the particular data set is backed up once a day. The security and compliance monitor 200 may then extract the frequency of once a day from the control status response and compare that value with the minimum value for the control. If the frequency of once a day is at least as frequent as required by the trust center report, then the control status for that control would be "in compliance".

Figure 6:
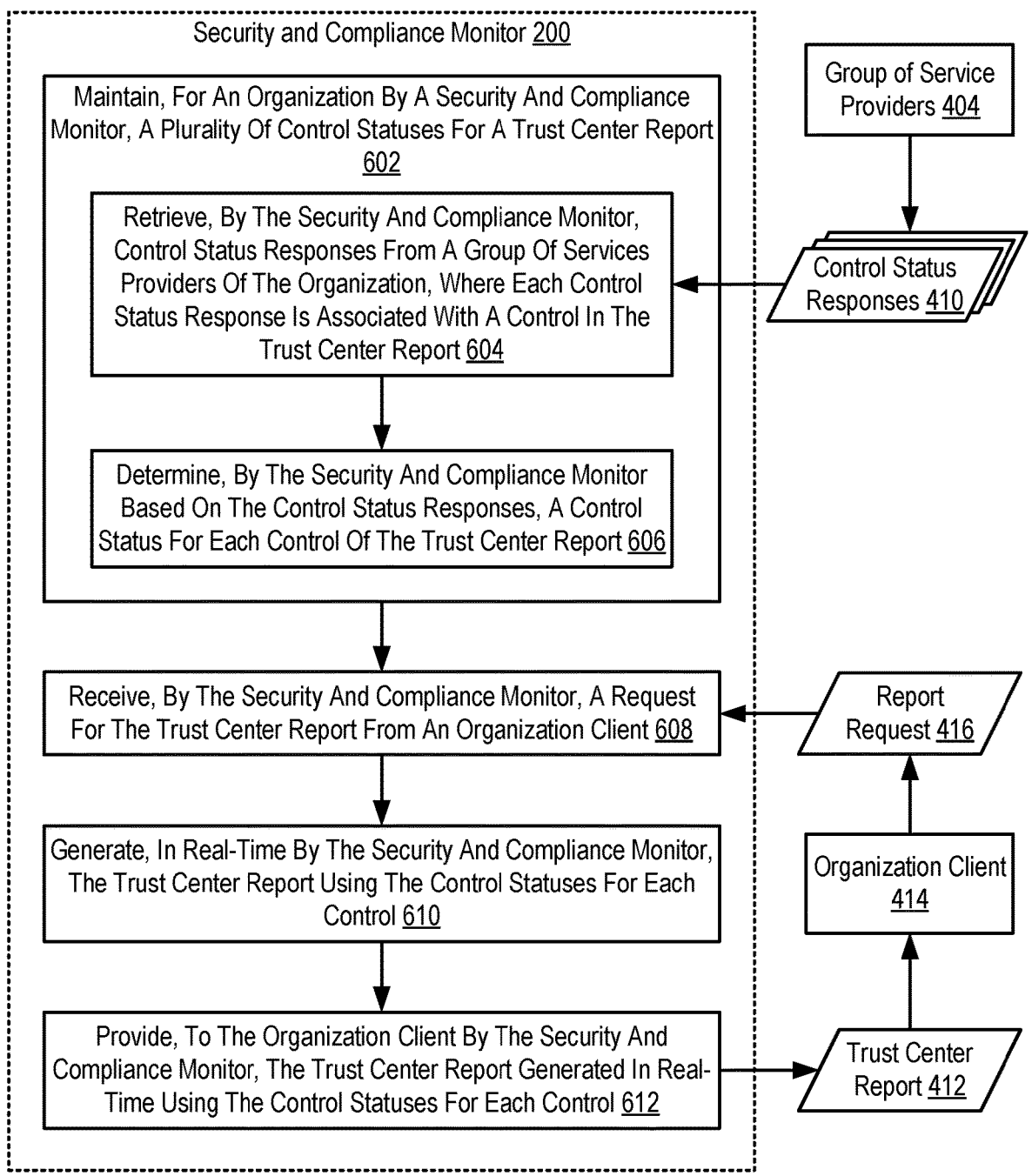
FIG. 6 sets forth a flow chart illustrating an exemplary method for an automated trust center for real-time security and compliance monitoring according to embodiments of the present invention.

The example method depicted in FIG. 6 also includes receiving 608, by the security and compliance monitor 200, a request 416 for the trust center report 412 from an organization client 414. Receiving 608 a request 416 for the trust center report 412 from an organization client 414 may be carried out by the organization client 414 accessing a network location (such as a website) that initiates the generation of the request 416. The network location may be managed by the organization but enable the organization client 414 to request the trust center report 412 from the security and compliance monitor 200. For example, the organization client 414 may access a particular page within the organization's website that initiates the generation and presentation of the trust center report 412 from the security and compliance monitor 200.

The example method depicted in FIG. 6 also includes generating 610, in real-time by the security and compliance monitor 200, the trust center report 412 using the control statuses for each control. Generating 610, in real-time, the trust center report 412 may be in response to the report request 416 and may be carried out by retrieving the most recent control status for each control from the control status repository. The security and compliance monitor 200 may then compile the control statuses and organize the control statuses for presentation. Generating 610 the trust center report 412 in real-time may mean that the generated report 412 includes the most recently retrieved control statuses which are no older than the length of time between control status updates.

The example method depicted in FIG. 6 also includes providing 612, to the organization client 414 by the security and compliance monitor 200, the trust center report 412 generated in real-time using the control statuses for each control. Providing 612, to the organization client 414, the trust center report 412 generated in real-time may be carried out by sending the trust center report 412 to the organization client 414 via a website within the organization's domain. Specifically, the trust center report 412 may be presented as a webpage within the organization's domain. However, the content of the webpage may be generated and provided by the security and compliance monitor 200.

In addition to providing the trust center report 412, the security and compliance monitor 200 may take action based on the trust center report 412. For example, the security and compliance monitor 200 may generate an alert if a control of the trust center report is not in compliance, and send the alert to the organization, organization client, or services provider from which the non-compliant control was detected. As another example, the security and compliance monitor 200 may take corrective action by altering the control to be in compliance if that control corresponds to a correctable setting (e.g., increasing the frequency of data backups to be in compliance with the trust center report).

Figure 7:
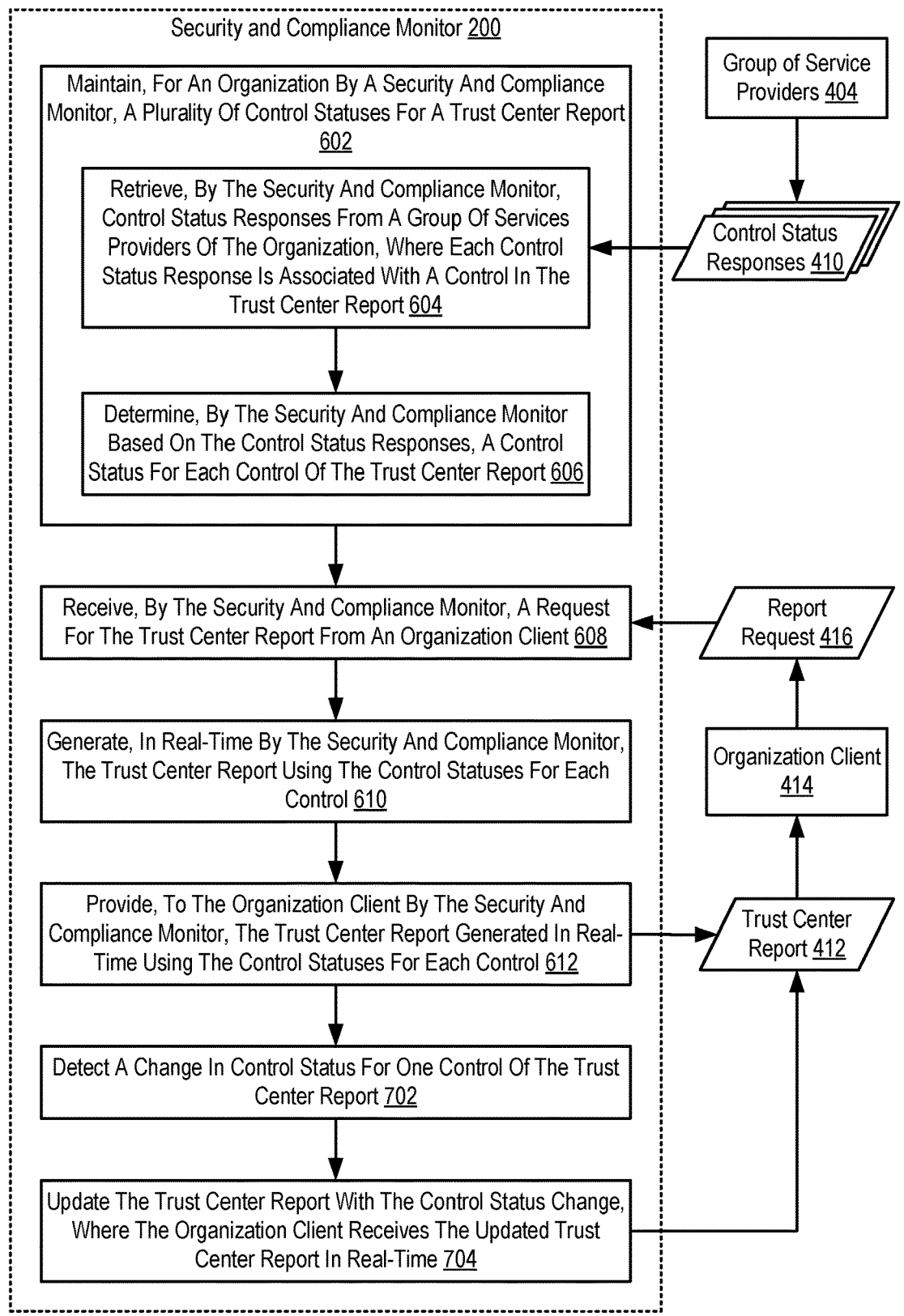
FIG. 7 sets forth a flow chart illustrating an exemplary method for an automated trust center for real-time security and compliance monitoring according to embodiments of the present invention.

For further explanation, FIG. 7 sets forth a flow chart illustrating a further exemplary method for an automated trust center for real-time security and compliance monitoring according to embodiments of the present invention that includes maintaining 602, for an organization by a security and compliance monitor 200, a plurality of control statuses for a trust center report 412, including: retrieving 604, by the security and compliance monitor 200, control status responses 410 from a group of services providers 404 of the organization, wherein each control status response 410 is associated with a control in the trust center report 412; and determining 606, by the security and compliance monitor 200 based on the control status responses 410, a control status for each control of the trust center report 412; receiving 608, by the security and compliance monitor 200, a request 416 for the trust center report 412 from an organization client 414; generating 610, in real-time by the security and compliance monitor 200, the trust center report 412 using the control statuses for each control; and providing 612, to the organization client 414 by the security and compliance monitor 200, the trust center report 412 generated in real-time using the control statuses for each control.

However, the example method depicted in FIG. 7 differs from the method of FIG. 6 in that the method of FIG. 6 further includes detecting 702 a change in control status for one control of the trust center report 412; and updating 604 the trust center report 412 with the control status change, wherein the organization client 414 receives the updated trust center report 412 in real-time. Once the trust center report 412 is presented to the organization client 414 (e.g., via an interface on a website), the security and compliance monitor 200 may continually or periodically update each control status with updated control status responses. Detecting 602 a change in control status for one control of the trust center report 412 may be carried out by retrieving a subsequent control status response from each services provider. As the subsequent control status responses are retrieved, each subsequent control status response may be compared to the initial control status response to determine whether the control status has changed. If the control statuses do not match, then a change in control status for the associated control of the trust center report 412 is detected.

Updating 704 the trust center report 412 with the control status change may be carried out by the security and compliance monitor 200 replacing an indicator within the trust center report 412 with an indicator that reflects the changed control status. The indicator replacement may occur in real-time during the visual presentation of the trust center report 412.

Figure 8:
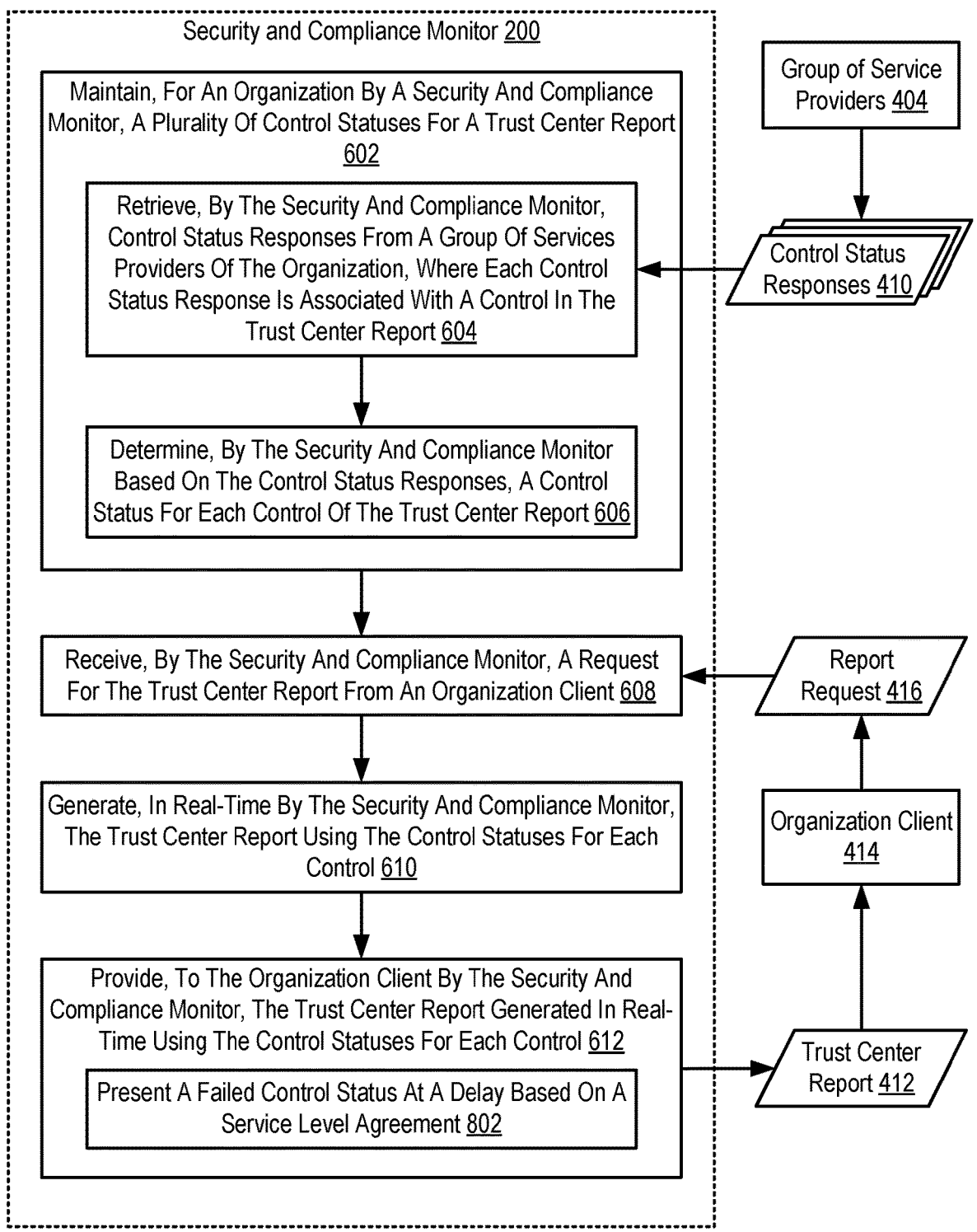
FIG. 8 sets forth a flow chart illustrating an exemplary method for an automated trust center for real-time security and compliance monitoring according to embodiments of the present invention.

For further explanation, FIG. 8 sets forth a flow chart illustrating a further exemplary method for an automated trust center for real-time security and compliance monitoring according to embodiments of the present invention that includes maintaining 602, for an organization by a security and compliance monitor 200, a plurality of control statuses for a trust center report 412, including: retrieving 604, by the security and compliance monitor 200, control status responses 410 from a group of services providers 404 of the organization, wherein each control status response 410 is associated with a control in the trust center report 412; and determining 606, by the security and compliance monitor 200 based on the control status responses 410, a control status for each control of the trust center report 412; receiving 608, by the security and compliance monitor 200, a request 416 for the trust center report 412 from an organization client 414; generating 610, in real-time by the security and compliance monitor 200, the trust center report 412 using the control statuses for each control; and providing 612, to the organization client 414 by the security and compliance monitor 200, the trust center report 412 generated in real-time using the control statuses for each control.

However, the example method depicted in FIG. 8 differs from the method of FIG. 6 in that providing 612, to the organization client 414 by the security and compliance monitor 200, the trust center report 412 generated in real-time using the control statuses for each control includes presenting 802 a failed control status at a delay based on a service level agreement. A service level agreement (SLA) is a contract between a services provider and a services client that documents the services the provider will supply and defines the service standards the provider is obligated to meet. The security and compliance monitor 200 may have an SLA with the organization in which the trust center report 412 need not immediately update a failed control status. Instead, the security and compliance monitor 200 may agree to a grace period (i.e., a delay) during which the organization may attempt to resolve the issue causing the failed control status. Presenting 702 a failed compliance status at a delay based on a service level agreement may be carried out by determining that the failed compliance status has not been addressed during the delay and presenting the failed control status in an updated trust center report 412 provided to the organization client 414 upon the expiration of the delay.

Advantages and features of the present disclosure can be further described by the following statements:

1. A method of real-time security and compliance monitoring, the method comprising: maintaining, for an organization by a security and compliance monitor, a plurality of control statuses for a trust center report, including: retrieving, by the security and compliance monitor, control status responses from a group of services providers of the organization, wherein each control status response is associated with a control in the trust center report; and determining, by the security and compliance monitor based on the control status responses, a control status for each control of the trust center report; receiving, by the security and compliance monitor, a request for the trust center report from an organization client; generating, in real-time by the security and compliance monitor, the trust center report using the control statuses for each control; and providing, to the organization client by the security and compliance monitor, the trust center report generated in real-time using the control statuses for each control.

2. The method of statement 1, further comprising: detecting a change in control status for one control of the trust center report; and updating the trust center report with the control status change, wherein the organization client receives the updated trust center report in real-time.

3. The method of statement 2 or statement 1, wherein providing, to the organization client, the trust center report comprises providing accesses to additional security and compliance framework reports.

4. The method of statement 3, statement 2, or statement 1, wherein providing, to the organization client, the trust center report generated in real-time comprises presenting a failed control status at a delay based on a service level agreement.

5. The method of statement 4, statement 3, statement 2, or statement 1, wherein retrieving control status responses from a group of services providers of the organization is performed periodically.

6. The method of statement 5, statement 4, statement 3, statement 2, or statement 1, wherein retrieving control status responses from a group of services providers of the organization is triggered by a detected change to one of the group of service providers.

7. The method of statement 6, statement 5, statement 4, statement 3, statement 2, or statement 1, wherein determining, based on the control status responses, a control status for each control of the trust center report comprises storing the control statuses for each control in a control status repository.

8. The method of statement 7, statement 6, statement 5, statement 4, statement 3, statement 2, or statement 1, wherein retrieving the control status responses from the group of services providers of the organization comprises receiving authorization from the organization to access the group of services providers.

9. The method of statement 8, statement 7, statement 6, statement 5, statement 4, statement 3, statement 2, or statement 1, wherein retrieving the control status responses from the group of services providers of the organization comprises issuing a control status request to the group of services providers and receiving, in response, the control status response.

10. The method of statement 9, statement 8, statement 7, statement 6, statement 5, statement 4, statement 3, statement 2, or statement 1, wherein the group of services providers comprise a cloud services provider.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method of real-time security and compliance monitoring, the method comprising:

maintaining, for an organization by a security and compliance monitor, a plurality of control statuses for a trust center report, including:

retrieving, by the security and compliance monitor, control status responses from a group of services providers of the organization, wherein each control status response is associated with a control in the trust center report; and determining, by the security and compliance monitor based on the control status responses, a control status for each control of the trust center report;

receiving, by the security and compliance monitor, a request for the trust center report from an organization client;

generating, in real-time by the security and compliance monitor, the trust center report using the control statuses for each control; and providing, to the organization client by the security and compliance monitor, the trust center report generated in real-time using the control statuses for each control.

2. The method of claim 1, further comprising:

detecting a change in control status for one control of the trust center report; and updating the trust center report with the control status change, wherein the organization client receives the updated trust center report in real-time.

3. The method of claim 1, wherein providing, to the organization client, the trust center report comprises providing accesses to additional security and compliance framework reports.

4. The method of claim 1, wherein providing, to the organization client, the trust center report generated in real-time comprises presenting a failed control status at a delay based on a service level agreement.

5. The method of claim 1, wherein retrieving control status responses from a group of services providers of the organization is performed periodically.

6. The method of claim 1, wherein retrieving control status responses from a group of services providers of the organization is triggered by a detected change to one of the group of service providers.

7. The method of claim 1, wherein determining, based on the control status responses, a control status for each control of the trust center report comprises storing the control statuses for each control in a control status repository.

8. The method of claim 1, wherein retrieving the control status responses from the group of services providers of the organization comprises receiving authorization from the organization to access the group of services providers.

9. The method of claim 1, wherein retrieving the control status responses from the group of services providers of the organization comprises issuing a control status request to the group of services providers and receiving, in response, the control status response.

10. The method of claim 1, wherein the group of services providers comprise a cloud services provider.

11. An apparatus for an automated trust center for real-time security and compliance monitoring, the apparatus comprising a computer processor, a computer memory operatively coupled to the computer processor, the computer memory having disposed within it computer program instructions that, when executed by the computer processor, cause the apparatus to carry out:
    maintaining, for an organization, a plurality of control statuses for a trust center report, including:
        retrieving control status responses from a group of services providers of the organization, wherein each control status response is associated with a control in the trust center report; and
        determining, based on the control status responses, a control status for each control of the trust center report;
    receiving a request for the trust center report from an organization client;
    generating, in real-time, the trust center report using the control statuses for each control; and
    providing, to the organization client, the trust center report generated in real-time using the control statuses for each control.

12. The apparatus of claim 11, further comprising computer program instructions that, when executed by the computer processor, cause the apparatus to carry out:
    detecting a change in control status for one control of the trust center report; and
    updating the trust center report with the control status change, wherein the organization client receives the updated trust center report in real-time.

13. The apparatus of claim 11, wherein providing, to the organization client, the trust center report comprises providing accesses to additional security and compliance framework reports.

14. The apparatus of claim 11, wherein providing, to the organization client, the trust center report generated in real-time comprises presenting a failed control status at a delay based on a service level agreement.

15. The apparatus of claim 11, wherein retrieving control status responses from a group of services providers of the organization is performed periodically.

16. The apparatus of claim 11, wherein retrieving control status responses from a group of services providers of the organization is triggered by a detected change to one of the group of service providers.

17. The apparatus of claim 11, wherein determining, based on the control status responses, a control status for each control of the trust center report comprises storing the control statuses for each control in a control status repository.

18. The apparatus of claim 11, wherein retrieving the control status responses from the group of services providers of the organization comprises receiving authorization from the organization to access the group of services providers.

19. The apparatus of claim 11, wherein retrieving the control status responses from the group of services providers of the organization comprises issuing a control status request to the group of services providers and receiving, in response, the control status response.

20. A computer program product for an automated trust center for real-time security and compliance monitoring, the computer program product disposed upon a computer readable medium, the computer program product comprising computer program instructions that, when executed, cause a computer to carry out:
    maintaining, for an organization, a plurality of control statuses for a trust center report, including:
        retrieving control status responses from a group of services providers of the organization, wherein each control status response is associated with a control in the trust center report; and
        determining, based on the control status responses, a control status for each control of the trust center report;
    receiving a request for the trust center report from an organization client;
    generating, in real-time, the trust center report using the control statuses for each control; and
    providing, to the organization client, the trust center report generated in real-time using the control statuses for each control.

* * * * *